United States Patent
Waatti

[11] Patent Number: 5,935,496
[45] Date of Patent: *Aug. 10, 1999

[54] SALT PELLETIZING METHOD

[75] Inventor: Kurt J. Waatti, Crystal Lake, Ill.

[73] Assignee: Morton International, Inc., Chicago, Ill.

[*] Notice: This patent is subject to a terminal disclaimer.

[21] Appl. No.: 08/909,891

[22] Filed: Aug. 12, 1997

Related U.S. Application Data

[63] Continuation-in-part of application No. 08/639,292, Apr. 25, 1996, abandoned, which is a continuation-in-part of application No. 08/459,211, Jun. 2, 1995, abandoned, which is a division of application No. 08/055,127, Apr. 29, 1993, Pat. No. 5,478,515.

[51] Int. Cl.[6] .................................. B05D 7/00; B05D 3/12
[52] U.S. Cl. .......................... 264/113; 264/112; 264/121; 427/220; 427/113; 427/365; 427/421
[58] Field of Search ............................. 427/11, 215, 220, 427/424, 365, 421, 359; 264/112, 113, 121

[56] References Cited

U.S. PATENT DOCUMENTS

| | | | |
|---|---|---|---|
| 4,170,619 | 10/1979 | Fridrich | 427/210 |
| 4,439,384 | 3/1984 | Bergendahl | 264/37 |
| 4,451,381 | 5/1984 | Heiss et al. | 252/1 |
| 5,165,613 | 11/1992 | Keller | 241/235 |
| 5,478,515 | 12/1995 | Waatti et al. | 264/113 |

*Primary Examiner*—Shrive Beck
*Assistant Examiner*—Bret Chen
*Attorney, Agent, or Firm*—Robert M. Didrick; Gerald K. White

[57] ABSTRACT

A water soluble dicarboxylic acid or an alkali metal salt thereof acts as a mold release agent for salt pellets when a salt-contacting surface of a roll-type briquetting press is coated with from about 0.02 to about 5 mg/cm$^2$ of a powder of the acid or alkali metal salt just prior to a charge of salt. The coating is achieved by spraying an air stream entraining the powder onto the press rolls or by spraying a solution of the release agent onto the rolls and evaporating the solvent to leave the powder on the rolls. The acid has from 6 to 10 carbon atoms; adipic acid being preferred. Salt pellets having a layer of the powder on their surface may be used in water softening systems wherein the pellets sit in a brine reservoir and supply salt for the recharging of an ion exchange resin. There is no formation of an unsightly scum on the surface of the brine and on the sides of the reservoir.

6 Claims, 4 Drawing Sheets

SALT PELLETIZING METHOD

This is a C-I-P of application Ser. No. 08/639,292, filed on Apr. 25, 1996, abandoned; which is a C-I-P of 08/459,211, filed Jun. 2, 1995, abandoned; which is a DIV of 08/055,127, filed Apr. 29, 1993, now U.S. Pat. No. 5,478,515.

BACKGROUND OF THE INVENTION

The most common method for softening water is the cation exchange method in which hard water is brought into contact with beads of a cation exchange resin whereby sodium ions in the resin are replaced by the calcium and magnesium ions that were in the water and the sodium ions are taken up by the water. When the resin is essentially depleted of sodium ions it is recharged by passing brine through the bed of resin beads to remove the calcium and magnesium ions as the soluble chlorides and replace them with the sodium ions. To generate the brine, sodium chloride in the form of pellets or blocks is placed in a tank and is dissolved by allowing it to sit in a measured amount of water in the tank for a sufficient time before each recharging cycle.

In the production of salt blocks, a release agent is required to minimize wear and damage to the inner surfaces of the block press mold box. These surfaces are commonly those of a stainless steel liner of the box. Calcium stearate is believed to be the most commonly used salt block release agent in the salt industry. The residue of calcium stearate on the surface of such blocks is insoluble when the salt is dissolved in a brine tank, however, and the accumulation of said residue forms an unsightly surface scum in the tank. In U.S. Pat. No. 5,478,515, which issued from application Ser. No. 08/055,127, which is a grandparent to this application, a powdered water-soluble release agent is sprayed onto the molding surfaces of the block press mold box. Some of the powder is transferred to the blocks but its presence does not generate an unsightly scum in brine tanks used in water softening systems.

Briquetting is a method for compacting salt which comprises introducing crystalline salt into the nip zone of a pair of intagliated, counter-rotating rolls in register with one another in a briquetting press the press, compacting the salt between the rolls into pellets with pressure, and discharging the pellets as the roll faces separate from one another. Because of the scum problem, the use of a release agent has not been seen to be much of an advantage in the formation of salt pellets on a roll-press. Now, the use of a water-soluble release agent has solved that problem.

This invention relates to a method for molding a water soluble salt with the aid of a water soluble release agent which facilitates the release of the compacted salt from the mold. More particularly, this invention relates to an improved method for compacting fine crystals of a water soluble salt in a block press mold box or a roll-type briquetting press whereby the wear of the bearings and other components of each is minimized. Still more particularly, the invention relates to a method for compacting fine crystals of the salt using a release agent whose presence on the blocks or pellets does not generate an unsightly scum in brine tanks used in water softening systems. Both blocks and pellets must resist handling and shipping damage and disintegration when stored in brine.

The term mold is defined for the purposes of this invention to include both a block press mold box and a roll-type briquetting press. The term salt is defined for the purposes of this invention to mean all water-soluble halides of sodium and potassium. The term salt compact is defined for the purposes of this invention to mean all compacted forms of salt, as exemplified by blocks, salt licks, bricks, pellets, nuggets, cubes, flakes, briquettes, and pillows. The special term salt block, however, is defined to mean a compressed mass of sodium chloride and additives which is commonly made in two sizes—25 and 50 pounds. The approximate dimensions of the 50 pound block are 8"×8"×11". Bricks are about 6"×4"×2". Salt pellets are generally rounded bodies having a volume of about 0.1 to about 0.2 cubic inch. Flat flakes weighing from 2 to 20 grams are made by compressing salt between smooth rolls and breaking up the sheet thus formed.

SUMMARY OF THE INVENTION

It is an object of this invention, therefore, to provide an improved method for compacting fine crystals of salt in a roll-type briquetting press or block press mold box.

It is a related object to provide a process whereby an ultra thin layer of release agent is applied to the molding surfaces so that a negligible increment of cost would be added.

It is a related object of this invention to reduce the friction between the molding surfaces and the salt being compacted whereby the amount of work required for compaction and release of the salt is reduced significantly, resulting in a lower requirement for electrical energy.

It is a related object of this invention to prolong the operating life of the roll sleeves, bearings, shafts, and like components in a roll-type pellet press through said reduction of friction.

It is a related object of this invention to minimize wear and damage to the molding surfaces of the block press mold box.

It is another related object of this invention to reduce the vibration of all of the components of the machinery comprising a pellet press or block press and thereby reduce long term metal fatigue and extend the useful life of the components.

It is yet another related object of the invention to reduce the noise level of the machinery.

It is still another object of this invention to reduce the nip angle of the salt between the pellet press rolls, thus reducing the amount of air entrapped in the feed salt and reducing the thickness of the web.

It is still another object of this invention to facilitate the release of the compacted salt pellets from the roll, thus increasing the pellet hardness and reducing the number of broken, shattered, and clam-shelled pellets and the amount of fines.

These and other objects of this invention which will become apparent from the following description are achieved by a method for compacting salt which comprises applying an ultra thin coating of a solid, water-soluble dicarboxylic acid or an alkali metal salt thereof as a mold release agent on at least one salt-contacting face of a mold, introducing crystalline salt into the mold, compacting the salt with pressure, separating the compacted salt from the mold and discharging it.

When manufacturing compressed salt blocks, the block release agent is applied on the salt-contacting surfaces of a block press mold box, the crystalline salt is introduced into the box and formed into a block with pressure, and the block is released from the box with a lesser pressure. When manufacturing pellets, the release agent is applied on a salt-contacting face of at least one of a pair of intagliated, counter-rotating rolls in register with one another in a briquetting press

DETAILED DESCRIPTION OF THE INVENTION

Figure 1:
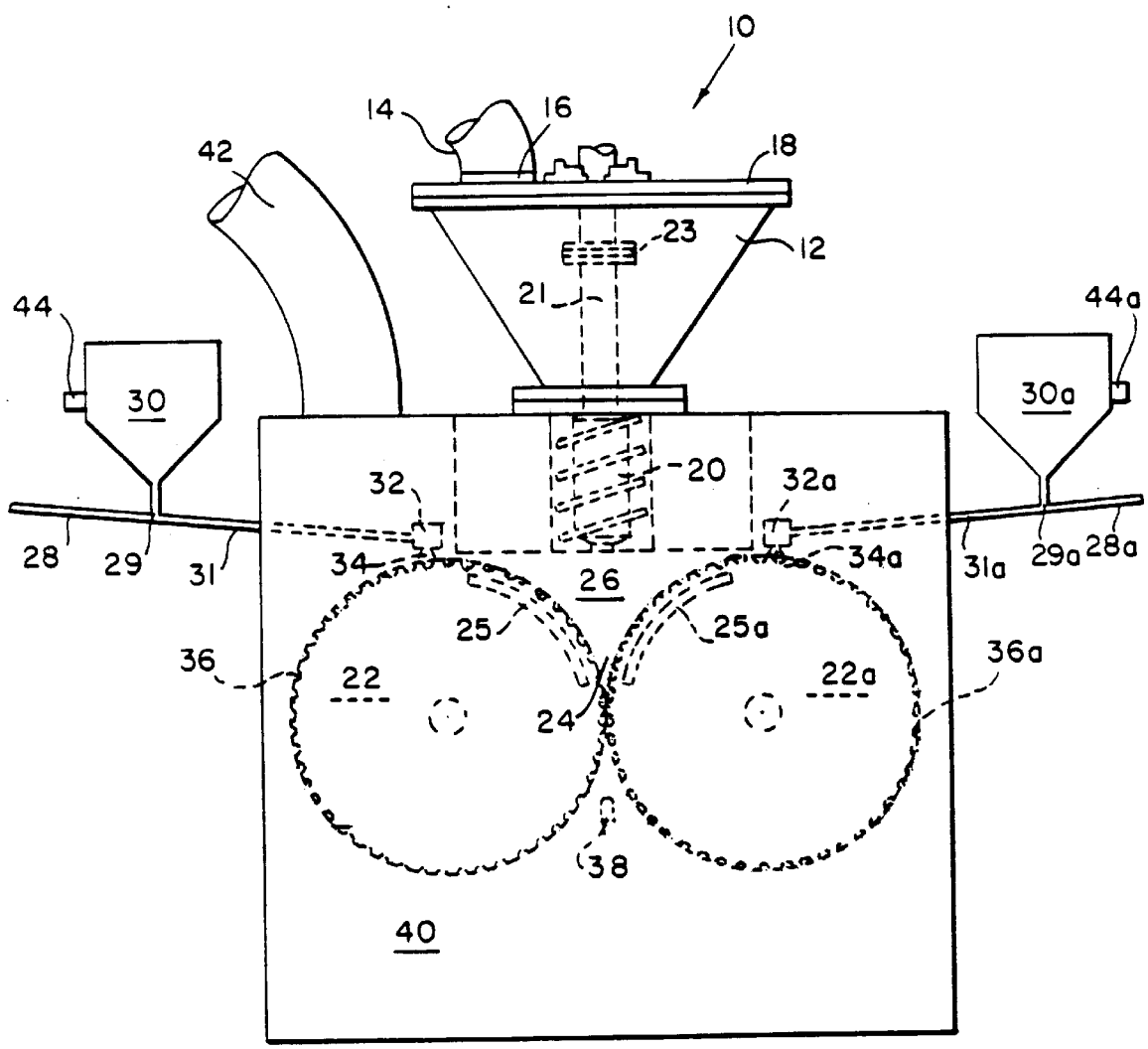
FIG. 1 of the drawing is a semi-diagrammatic side view of a salt pelletizing press as modified for use in a first embodiment of the method of this invention.

A balance between good lubricant qualities and water solubility, particularly solubility in brine, is important to the operation of the method of this invention and to the use of the resulting salt blocks and pellets in water softening systems. Preferably, therefore, the acid will have from 6 to 10 carbon atoms which, more preferably, are in a straight chain as exemplified by adipic, 2-methyladipic, 3-methyl adipic, pimelic, suberic, azelaic, and sebacic acid. A further advantage of these acids is that iron that may be present in the water supply is maintained in a soluble form in the brine of the water softening system as the brine stands in the reservoir. As the number of carbon atoms in the acid increases the lubricity increases and the water solubility decreases. In consideration of the solubility, lubricity, cost, and acidity of the acids, adipic acid is particularly preferred. Preferably, the particle size is about 200 mesh or less. A desiccant such as a silica sold under the trademark Silox 15 may be added to the acid in an amount of about 0.25% by weight of the mixture prior to pulverization to reduce caking of the powdered acid.

The alkali metal salts include the mono- and di-sodium and potassium salts of adipic, azelaic, and sebacic acids and are exemplified by mono-sodium adipate, di-sodium adipate, mono-potassium adipate, di-potassium adipate, mono-sodium pimelate, di-sodium suberate, mono-potassium-2-methyladipate, di-potassium suberate, and mono-sodium sebacate.

In one embodiment of this invention, the release agent is applied as a very fine powder so that it can be distributed over the mold faces as a substantially uniform thin layer which is from about 0.05 mil to about 10 mils thick. In the case of a block press mold box, the amount of powdered release agent distributed over the liner surfaces is from about 2 to about 10 mg/cm$^2$ as a substantially uniform thin layer which is from about 2 to about 6 mils thick. A portion of it is transferred from the mold surfaces to the surfaces of the block during the compression to give a layer having an average thickness of from about 0.2 mil to about 3 mils.

The amount of powdered release agent distributed on the intagliated face of a briquetting press roll is from about 0.02 to about 5 mg/cm$^2$. A portion of it is transferred from the roll face to the surface of the pellet during the compaction to give a layer averaging in thickness of from about 0.02 mil to about 5 mils. In another embodiment of the invention, a sufficient amount of the release agent for the purposes of this invention may be applied by spraying a thin layer of a solution of the acid or salt onto the molding surfaces. On evaporation of the solvent, an ultra thin coating of the release agent remains on the compacted salt. An ultra thin coating is defined for the purposes of this invention as weighing from 0.005 to 0.012 mg/cm$^2$, and preferably from 0.005 to 0.01 mg/cm$^2$. The coating is from about 0.4 to about 1 micron (or micrometer) thick. The amount of release agent used in this embodiment of the invention is from about 5 to about 10 parts per million parts (ppm) by weight of salt being compacted.

Water is a preferred solvent from the standpoint of safety. Because the solubility of adipic acid, for example, in water increases rapidly as the temperature of the water is increased, it is preferable to use an aqueous solution at a temperature of from about 40° to about 100° C., preferably from about 60 to about 80° C. At 15° C., for example, 100 grams of water dissolves only 1.42 grams of adipic acid but the solubility increases from 4.5 grams at 40° C., to 18.2 grams at 60° C. and 73 grams at 80° C.

From the standpoint of efficiency, however, a low boiling alcohol (i.e., boiling point less than 100° C.) such as methyl, ethyl, n-propyl, isopropyl, and t-butyl alcohol is preferred as the solvent for the acids. A mixture of the alcohols is suitable and a mixture of one or more of the alcohols with water is particularly preferred because of the marked increase in the solubility of the dicarboxylic acid in mixtures of alcohol and small amounts of water in comparison with the neat alcohols. About 5 grams of adipic acid dissolves in 100 grams of ethanol, for example, but the solubility increases to about 33–34 grams per hundred grams of a solvent consisting of from 20% to 40% water and from 60 to 80% ethanol, by weight. In like manner, the solubility of adipic acid increases from 1.9 grams per hundred grams of isopropanol to 12.4 grams per hundred grams of a 60:40 % mixture of isopropanol and water; 13.5 grams of adipic acid dissolves in 100 grams of an 80:20% mixture of isopropanol and water. Said ethanol/water and isopropanol/water mixtures are especially preferred as solvents for the solid dicarboxylic acids for the purposes of this embodiment.

In each of the embodiments of this invention, a considerable percentage of the release agent does not contact the molding surfaces and thus does not come into contact with the salt being compacted. Thus, the amount of release agent on the salt blocks and pellets is variable and will range from about 2 to about 6 ppm by weight.

Turning now to the drawings, the pellet press 10 in FIG. 1 comprises the salt hopper 12, the salt delivery conduit 14 communicating with the hopper through the port 16 in the cover 18 and with a storage bin (not shown), the auger 20, the auger drive shaft 21 (a drive motor and the section of shaft 21 connected thereto not being shown), and a pair of intagliated, counter-rotating rolls 22 and 22a. The shaft 21 is journalled at its passage through the cover 18 and within the hopper at 23. Salt is retained in the nip zone 24 between the rolls by the cheek plates 25 and 25a and the step 26 integral to both disposed at opposite ends of said rolls.

The drive roll 22 is mounted in fixed bearing blocks and the floating roll 22a is mounted in movable bearing blocks. Pistons in hydraulic cylinders press against the movable bearing blocks, forcing the rolls 22 and 22a together, and countering the roll separating force of the salt feed. The roll separating force is countered by adjusting the pressure on the hydraulic cylinders. The bearing blocks and the hydraulic cylinders, being components of conventional presses available from suppliers such as K.R. Komarek, Inc. and several others, are not shown.

The air conduits 28 and 28a conduct dry air from a compressor (not shown) through the venturi tubes 29 and 29a, respectively, which draw powder from one or both of the tanks 30 and 30a into the slightly inclined lines 31 and/or 31a and thence into at least one of the manifolds 32 and 32a. The powdered water soluble acid is sprayed from at least one of the manifolds through a plurality of nozzles 34 and/or 34a arrayed along the length of each manifold into and about the pockets 36 and/or 36a of the rolls 22 and 22a. The auger 20 delivers a constant charge of approximately 40 mesh crystalline salt from the hopper 12 into the array of pockets 36 and 36a as the opposing rolls meet at the nip zone 24 and compact the salt into pellets 38. The nip angle of the salt, which is normally about 17° above the horizontal center line of a roll, is reduced. As the roll faces separate from one another again, the pellets 38 are released from the pockets onto a sizing screen (not shown). An exhaust fan (not shown) draws salt dust from the housing 40 through the flexible rubber tubing 42 into a collector (not shown).

As an alternative to air-spraying, the powder may be sifted out of a channel-shaped manifold having screened openings disposed toward a face of at least one of the rolls 22 and 22a.

In order to overcome the caking tendency of adipic acid mentioned above and provide for a continuous delivery of the powder, the storage tanks 30 and 30a may be equipped with the vibrators 44 and 44a.

Figure 2:
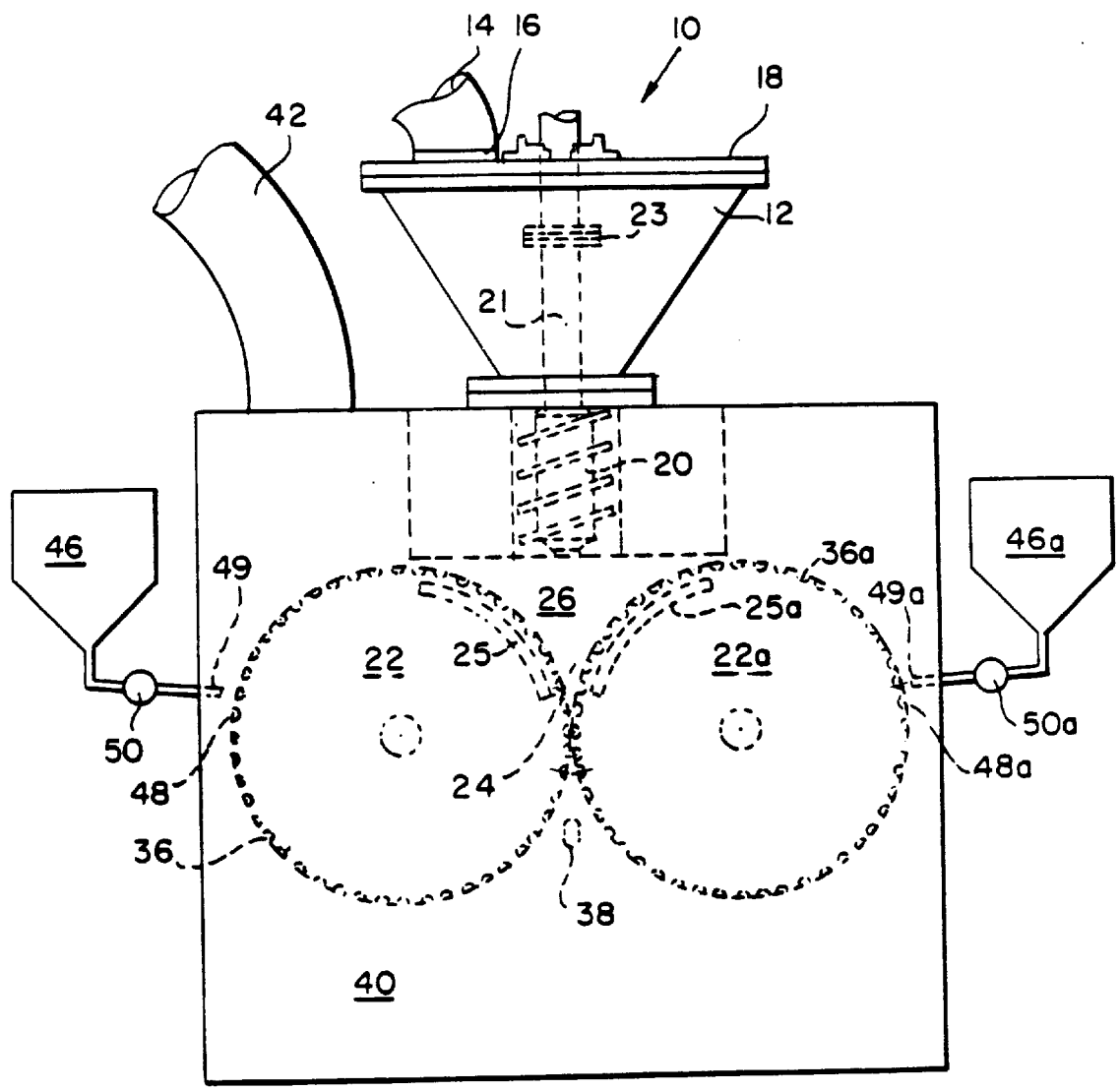
FIG. 2 is a semi-diagrammatic side view of a salt pelletizing press as modified for use in a second embodiment of the method of this invention.

In FIG. 2, a solution of adipic acid is stored in the tanks 46 and 46a and the acid is applied by spraying the solution onto one or both of the rolls 22 and 22a at transverse regions 48 and 48a. An ultra thin layer of the acid, sufficient for the purposes of this invention, may be applied to the roll(s) by spraying a concentrated solution of adipic acid from one or both of the nozzles 49 and 49a at a rate of from about 25 to about 40 milliliters per minute with the aid of the pumps 50 and 50a onto at least the middle portion of a corresponding roll and evaporating the solvent quickly to leave a coating of a fine solid acid on the roll(s). The ultra thin layer weighs from about 0.005 to about 0.010 mg/cm$^2$. The amount of the adipic acid distributed on the intagliated face of a briquetting press roll is from about 2.5 to about 5 parts per million parts of the salt being compacted. It is believed that substantially all of the release agent that sticks on the press roll is transferred to the compacted salt because at such low application weights spraying of the solution must be continuous or nearly so. An approximation of continuous spray may be achieved by an intermittent spray wherein the intervals between spray pulses are very short.

Alternatively, the solution may be carried in a stream of air much like the powder as described above. The normally hot rolls will cause the vaporization of a substantial amount of the solvent before salt is charged into the pockets 36 and 36a. An exhaust fan draws the evaporated solvent as well as the salt dust from the housing 40 through the flexible rubber tubing 42 into a collector (not shown) and, optionally, a condenser. The pockets 36 and 36a are arrayed in rows completely around the circumference of the rolls 22 and 22a, respectively, as shown in FIGS. 1 and 2.

Figure 3:
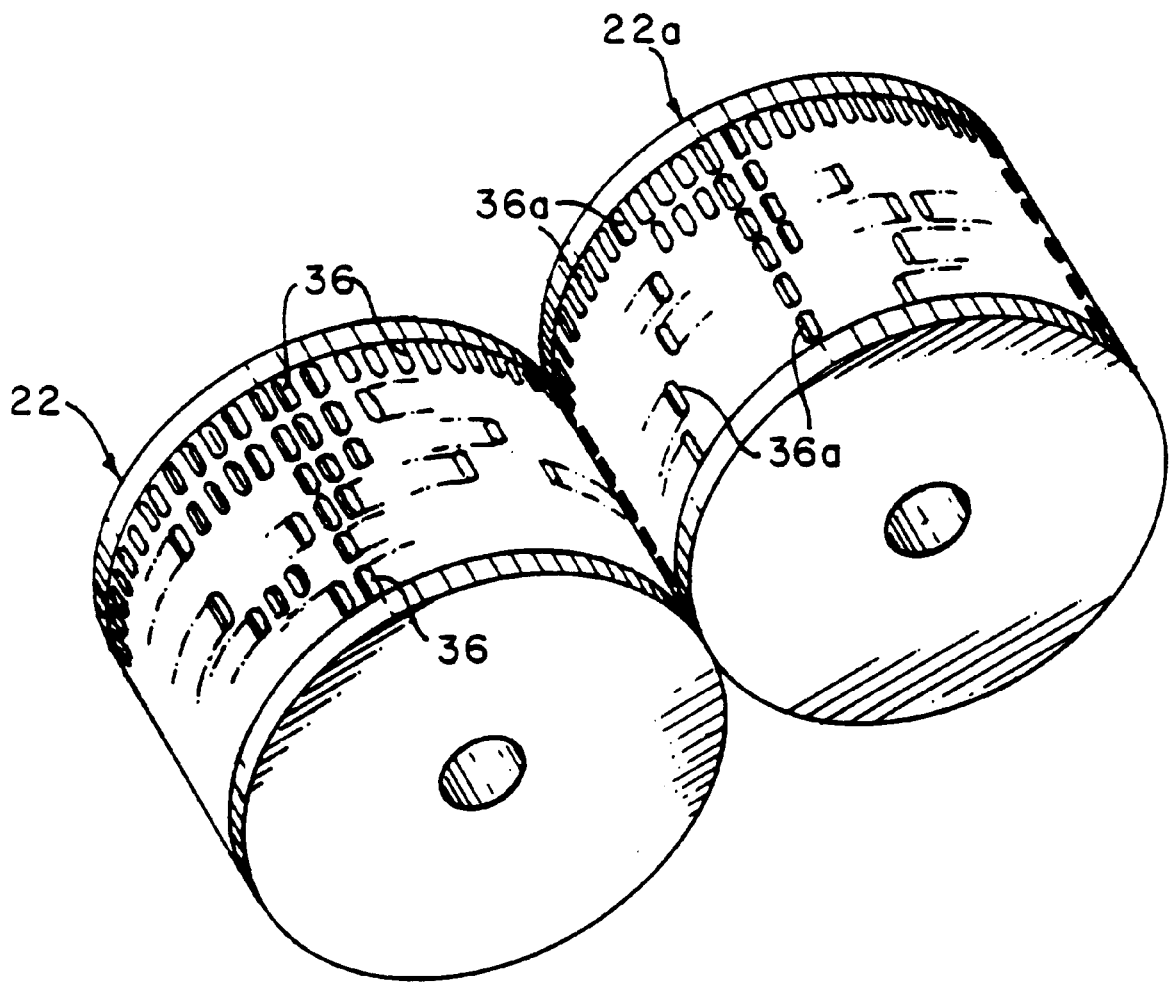
FIG. 3 is a perspective view of the pair of intagliated rolls of FIGS. 1 and 2.

In FIG. 3, the opposing pockets are shown to be in register so that the salt present in each is pressed together to form the pellets 38.

About 15% less electrical energy is required to drive the rolls 22 and 22a during the operation of the method of this invention because the presence of the release agent on the surfaces of the pockets 36 and 36a reduces the drag or friction normally encountered. The rpm of the press rolls may therefore be increased in order to load the drive motor fully. There is much less vibration of the press machinery and, consequently, much less noise in the press area.

Figure 4:
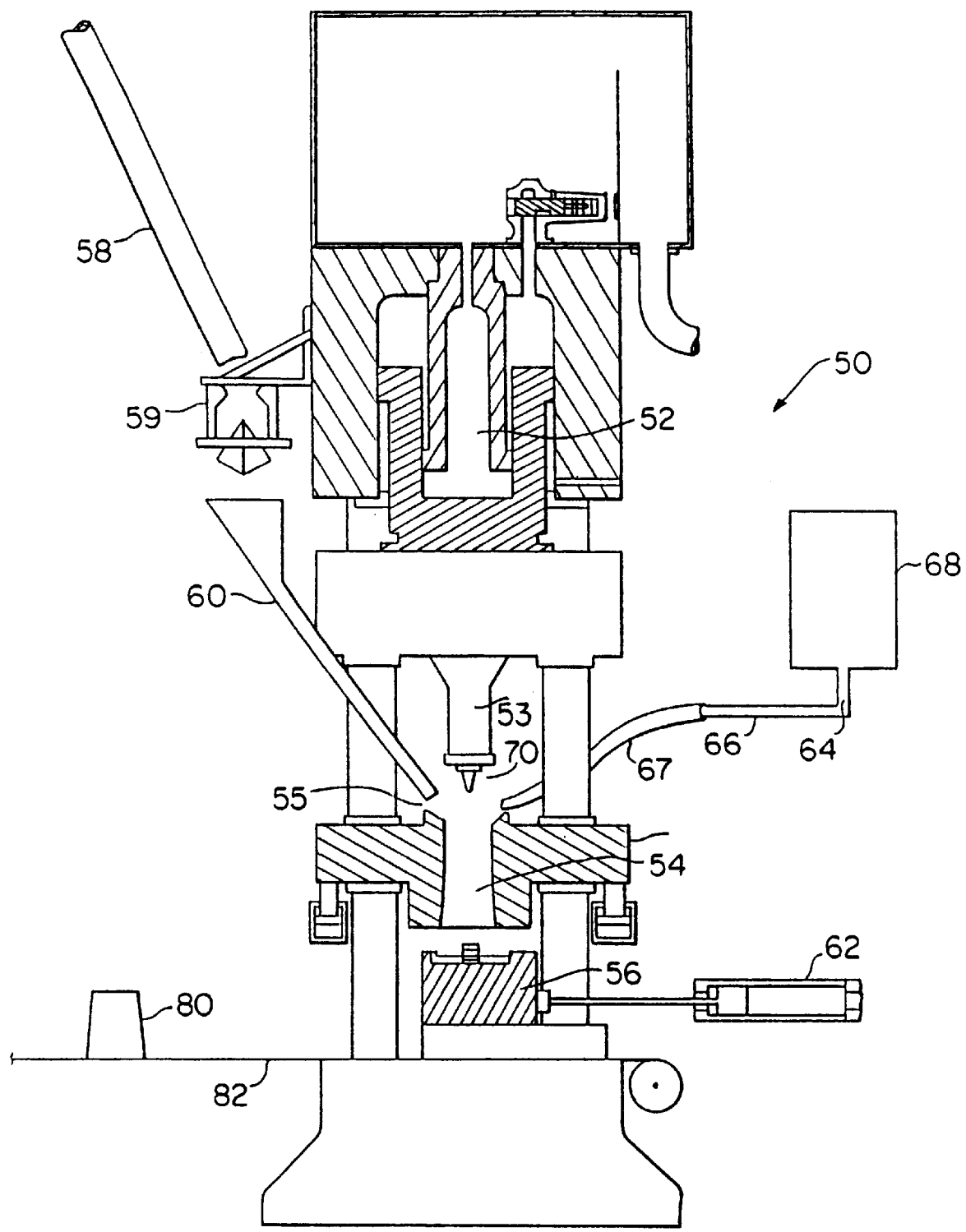
FIG. 4 is a cross-section of a salt block press used in a second embodiment of this invention.

In FIG. 4, the block press 50 is a Columnar Elmes 1000 ton press. Compression energy is obtained from hydraulic pressure generated by a series of motors and pumps (not shown) through which hydraulic fluid is circulated. In the rest mode of the press, the main ram 52 and the top die 53 attached to it are retracted in the up position, the mold box 54 and the collar 55 integral therewith are in the down position, and the anvil 56, which acts as a slidable floor for the mold box, is in the forward position. The salt delivery conduit 58 communicates with a storage bin (not shown) and the scale 59, which is mounted independently of the press 50 in dispensing relation above the salt spout 60 which, in turn, is mounted in dispensing relation with the mold box 54. Also communicating with the mold box is the acid powder delivery line 62 in which the venturi 63 communicates with the acid storage tank 64. The air conduit 65 conducts air from a compressor (not shown) into the venturi 63 which draws powder from the tank 64 into line 62 onto which the flexible tubing 66 is attached as an extension. The tubing 66 is disposed on the collar 55 in communication with the chamber 67 of the mold box 54. The anvil cylinder 68 is connected to the anvil 56 in push-pull operative relation therewith.

In operation, one block 70 having a nominal weight of 50 pounds is made every 12 seconds by admitting compressed air into the line 65 and venturi 63 where the induced vacuum draws the powdered acid into the air stream, injecting the acid into the chamber 67, charging about 50.5 pounds of salt into the scale 59 and releasing it onto the spout 60 from which it pours into the chamber 67. The top die 53 is forced against the salt in the mold box chamber by hydraulic pressure to compress the salt at a preset pressure limit of from about 18,000 to about 20,000 psi. Both the spout 60 and the line 62 are disposed away from the path of the descending die 63. When the pressure limit is reached, the main ram and mold box are raised and the anvil cylinder 68 retracts the anvil before the main ram is again pressurized again to force the block 70 out of the mold box chamber 67 onto the conveyor 69 which delivers the block to a palleting area. The sequence and timing of the steps are determined by a conventional controller (not shown) such as an Allen Bradley PLC 5 controller.

In FIG. 5, the solution of adipic acid stored in tank 80 is sprayed through the nozzle 81 at a rate of from about 25 to about 40 milliliters per minute with the aid of the pump 82 into the chamber 67 of block press 50. The compaction of the salt is as described above.

Having read the foregoing detailed description of the preferred embodiments of the invention, one of ordinary skill in the art of compression molding will appreciate that many other embodiments of the invention may be made without departing from the scope of the invention as defined by the following claims.

The subject matter claimed is:

1. A method for pelletizing salt which comprises spraying a powdered water-soluble dicarboxylic acid having from 6 to 10 carbon atoms or alkali metal salt thereof as a mold release agent onto at least one salt-contacting face of a pair of intagliated, counter-rotating rolls in register with one another in a briquetting press, introducing crystalline salt into the nip zone of the press, compacting the crystalline salt between the rolls into pellets, thereby transferring a portion of the release agent to the surface of the pellets, and discharging the pellets as the roll faces separate from one another.

2. The method of claim 1 wherein the mold release agent is entrained in a stream of air.

3. The method of claim 1 wherein the amount of mold release agent sprayed onto the salt-contacting face is from about 0.02 to about 5 mg/cm$^2$.

4. The method of claim 3 wherein the acid is adipic mold release agent.

5. The method of claim 1 wherein the acid is adipic mold release agent.

6. The method of claim 1 wherein the mold release agent on the surface of a pellet is from about 0.02 mil to about 5 mils thick.

* * * * *